(12) United States Patent
Hansmann et al.

(10) Patent No.: US 6,391,088 B1
(45) Date of Patent: May 21, 2002

(54) METHOD FOR HEAT-TREATING RECYCLINGS CONTAINING OIL AND IRON OXIDE

(75) Inventors: Thomas Hansmann, Trier (DE); Romain Frieden, Beidweiler; Marc Solvi, Ehlanges/Mess, both of (LU)

(73) Assignee: Paul Wurth S.A., Luxembourg (LU)

(*) Notice: Subject to any disclaimer, the term of this patent is extended or adjusted under 35 U.S.C. 154(b) by 0 days.

(21) Appl. No.: 09/786,272
(22) PCT Filed: Aug. 30, 1999
(86) PCT No.: PCT/EP99/06382
§ 371 Date: Mar. 2, 2001
§ 102(e) Date: Mar. 2, 2001
(87) PCT Pub. No.: WO00/14286
PCT Pub. Date: Mar. 16, 2000

(30) Foreign Application Priority Data

Sep. 2, 1998 (LU) .............................. 90282

(51) Int. Cl.[7] .............................. C21B 13/08
(52) U.S. Cl. .............................. 75/483; 75/658; 75/694; 75/962
(58) Field of Search .............................. 75/483, 962, 694, 75/658

(56) References Cited

U.S. PATENT DOCUMENTS

| | | |
|---|---|---|
| 2,089,782 A | 8/1937 | Carlsson |
| 3,650,830 A | 3/1972 | Mathis |
| 3,756,804 A | 9/1973 | Stevenson |
| 4,118,220 A * | 10/1978 | von Dreusche, Jr. et al. .............................. 75/10.29 |
| 4,326,883 A | 4/1982 | Schwarz |
| 6,015,527 A * | 1/2000 | Kamei et al. .............................. 266/145 |

FOREIGN PATENT DOCUMENTS

| | | |
|---|---|---|
| DE | 552 837 | 6/1932 |
| DE | 38 41 835 | 11/1989 |
| GB | 597530 | 1/1948 |

\* cited by examiner

Primary Examiner—Melvyn Andrews
(74) Attorney, Agent, or Firm—Oblon, Spivak, McClelland, Maier & Neustadt, P.C.

(57) ABSTRACT

Process for thermal treatment of residual materials containing oil and iron oxide in a multiple-hearth furnace, which has several hearths one above the other, the residual materials containing oil and iron oxide being mixed with a solid reducing agent, introduced continuously into the multiple-hearth furnace, charged on the top hearth and transferred gradually to the lower hearths, the residual materials containing oil and iron oxide being dried in the top hearths, the oil subsequently evaporated and pyrolised and the reducing agent reacting with the iron oxides to form directly reduced iron, the directly reduced iron being discharged with residues of reducing agents in the areas of the bottom hearth of the multiple-hearth furnace.

22 Claims, 1 Drawing Sheet

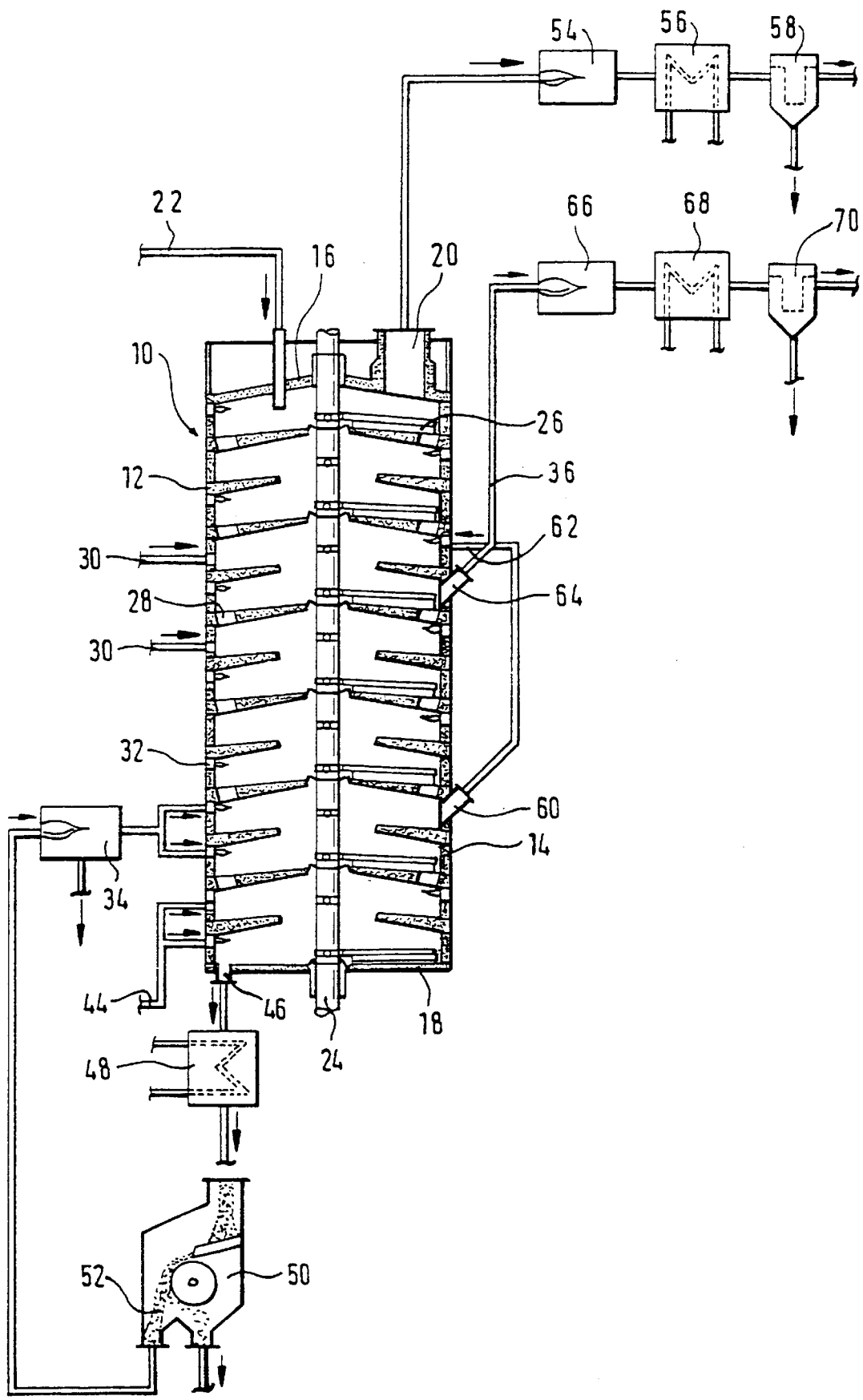

METHOD FOR HEAT-TREATING RECYCLINGS CONTAINING OIL AND IRON OXIDE

The invention relates to a process for thermal treatment of residual materials containing oil and iron oxide in the form of oily sludges, e.g. sludges from steel mills.

Large quantities of sludges containing iron oxide, which are produced during cleaning of the cooling water from the continuous casting plants or mill trains, occur in the rolling mills in the steel industry. Depending on the granulometry of the iron constituents these sludges are contaminated by oil or grease residues. The oil or grease content increases the finer the granulometry of the constituents. The finest fraction (<40 $\mu$m), which may contain 14% oil, is particularly oily. Because of the high oil content it is difficult to return these sludges to the existing production line. An attempt was thus made to utilise these sludges in sintering plants. However, such high dioxin concentrations were measured during combustion of these sludges that this type of treatment is neither economical nor ecological. These sludges are therefore deposited in artificial lakes and thus pose a potential hazard to the environment, because oil and other residues may enter the ground water.

Typical compositions of these sludges are shown in the following table:

TABLE 1

|  | Fe (%) | Oil (%) | H$_2$O (%) |
| --- | --- | --- | --- |
| Rolling mill sludges | 50–70 | 2–14 | 30–40 |

In this context "oil" is generally understood to mean primarily lubricants and greases, which are used when rolling steel. Accordingly, they are chiefly hydrocarbons containing the various additives customary with these lubricants.

Document DE-C-552 387 relates to a process for the smelting of fine iron ores in a reduction furnace with six hearths. The multiple-hearth furnace is divided into two zones. In the first zone, formed by the top two hearths, the iron ore is initially pre-heated. To do this, hot gases of any suitable kind are supplied in an adjustable quantity. Burners may additionally be used, if appropriate. The second zone, comprising the bottom four hearths, is gastightly insulated from the pre-heating zone. No gas exchange therefore takes place between the two zones. The second zone is intended for the reduction of the iron ore. For this purpose reduction gases are supplied either in the bottom hearth or separately in each individual hearth. The top three hearths of the reduction zone are provided with muffles, to which heating gases are supplied. In this way the heating gases do not come into contact with the ores, and so the composition of the reduction gases can be altered independently of the temperature adjustment.

Consequently the task of the invention is to propose a process for thermal treatment of such residual materials containing oil and iron oxide.

According to the invention this problem is solved by a process for thermal treatment of residual materials containing oil and iron oxide in a multiple-hearth furnace with several hearths one above the other, in which the residual materials containing oil and iron oxide are mixed with a solid reducing agent, introduced continuously into the multiple-hearth furnace, placed on the top hearth and gradually transferred to the lower hearths, the residual materials containing oil and iron oxide being dried on the top hearths, and the oil subsequently evaporated and pyrolised. A gas containing oxygen is injected into the multiple-hearth furnace and reacts with part of the reducing agent to form reduction gas, the reduction gas reacting with the iron oxides to form directly reduced iron, the latter being discharged together with residues of reducing agents in the area of the bottom hearth in the multiple-hearth furnace.

An important advantage of the invention is that by-products are obtained from important constituents of the residual materials containing oil and iron oxide. The iron content can be returned after passing through the process into the production operations of the steel mill, the oil is pyrolised and the resulting pyrolysis gases are burnt. The oil thus contributes to generation of the necessary process heat. Ash consisting essentially of inert materials such as SiO$_2$, Al$_2$O$_3$, MgO, etc. and possibly an excess of reducing agents may remain.

Sludge-type residual materials containing oil and iron oxide can be charged in this process, agglomeration of the particles being prevented by selective process control and continuous circulation. The process supplies a fine-grained end product regardless of the consistency of the feed material.

This is particularly advantageous if ash-forming reducing agents are used. As the solid end product is fine-grained, the ash can easily be separated from the iron. This separation can take place, for example, in the hot condition by screening.

After cooling below 700° C. it is possible on the other hand to separate the reduced iron via magnetic separators from the ash and excess reducing agent. The quality of the directly reduced iron obtained in this way is virtually independent of the quantity of residues of the reducing agent.

The iron obtained can subsequently be processed into briquettes or introduced directly into a melting furnace (electric furnace, etc.) and further processed.

The reducing agent residues produced can be used with any unused reducing agents in a separate gasification reactor, the ash-forming constituents being advantageously separated as liquid slag and the crude gas formed used in the multiple-hearth furnace as combustion or reducing gas. Accordingly it is also possible to use a cheaper reducing agent with a relatively high ash content and/or work with a relatively high excess of reducing agent, which prevents agglomeration of the residual materials.

When working with excess reducing agents it is advantageous to process the residues in order to separate and reuse the unused reducing agents. This can be done, for example, by screening the residues, if the unused reducing agents are present in sufficiently coarse form. The unused reducing agents can be introduced directly into the multiple-hearth furnace.

However, part of the required reducing agent can also be deposited on one or more hearths at lower levels in the furnace.

It is thus possible that coarse-grained reducing agents (1–3 mm) are introduced at higher levels in the multiple-hearth furnace and fine-grained reducing agents (<1 mm) further below. Consequently discharge of dust with the waste gases is largely avoided and the reaction accelerated by the fine reducing agent particles introduced further below.

Consumption of reducing agents is reduced by the charging of coarser particles, because the small particles are quickly consumed by reaction with H$_2$O and CO$_2$ from the waste gas in the upper hearths, on which an oxidising atmosphere prevails. The reduction gases in the furnace can be adjusted to an optimum concentration by selective feed of reducing agents in the lower hearths of the furnace with the result that a higher degree of metallisation can be achieved.

The process space is subdivided into different zones, the solids move continuously from the top downwards and the gases are conducted from the bottom upwards through the furnace. By subdividing the process space into different zones the process conditions in the different zones or even for each hearth can be measured and selectively influenced if required.

The residual materials containing oil and iron oxide are circulated continuously by rakes mounted on each furnace hearth and conveyed gradually to the underlying hearth.

Agglomeration of the reducing agents and residual materials containing oil and iron oxide is prevented by the continuous circulation. The rate of circulation depends on many factors such as the geometry of the rakes, the thickness of the layers, etc. The residual materials containing oil and iron oxide, the reducing agents and any reduced iron on the hearths should be circulated at least once every one to three minutes with the result that agglomeration is largely prevented.

Gases containing oxygen can be injected on the hearth, where the heat requirement must be covered by combustion of the excess process gases.

It is advantageous to use gases containing oxygen with a temperature of at least 250° C.

A gaseous reducing agent can additionally be injected on the lowest hearths of the multiple-hearth furnace. This ensures more complete reduction of the oxides.

According to a further advantageous embodiment one or more hearths in the furnace are heated by burners.

In order not to reduce the concentration of reduction gases in the lower part of the furnace by flue gases of the heating system, energy can also be fed indirectly, i.e. by radiation heating, in this case.

According to another preferred embodiment gases are exhausted from the multiple-hearth furnace at one or more hearths. These hot gases can subsequently be passed through a $CO_2$ scrubber to reduce the gas quantity and increase the reduction potential of the gas or through an additional reactor, in which carbon is present, so that the carbon dioxide present in the hot gases reacts with the carbon to form carbon monoxide according to Boudouard equilibrium and thus increases the reduction potential of the gas. The gases enriched with carbon monoxide are subsequently returned to the multiple-hearth furnace.

If necessary, additives are fed to one or more hearths in the lower section of the furnace.

In such a case it is advantageous to exhaust gases on a hearth above the hearth, on which additives are introduced.

According to a preferred embodiment gases are exhausted from the multiple-hearth furnace below a specific hearth and subsequently re-injected above this hearth into the furnace.

Iron oxide dusts or sludges containing carbon and metal can be introduced into the furnace at this hearth. As soon as they reach a certain temperature (about 900° C.) the heavy metal oxides begin to react with the reducing agents whereby the heavy metals formed evaporate and are discharged together with the waste gases from the multiple-hearth furnace.

The heavy metals are advantageously exhausted on the hearths, where they are formed, and treated separately from the other waste gases.

The waste gases are subsequently oxidised, e.g. in an after-combustion chamber, the heavy metals being converted to heavy metal oxides, which can then be separated from the waste gases in filter equipment. Typical compositions of dusts and sludges containing heavy metal from electric or converter steel mills are shown in the following table.

TABLE 2

|  | Fe (%) | Zn (%) | Pb (%) | C (%) | $H_2O$ (%) |
|---|---|---|---|---|---|
| Dusts | 20–30 | 20–35 | 1–10 | 1–2 | — |
| Sludges | 20–30 | 2–8 | 1–5 | — | 30–40 |

The multiple-hearth furnace can be operated under a specific overpressure for a further increase in the productivity. In contrast to a rotary furnace, which is sealed via water seals with a diameter of about 50 m, this can be achieved very easily in a multiple-hearth furnace, which has only small seals on the drive shaft. In such a case pressure locks for the feed and removal of material must be provided.

According to another aspect of the present invention the use of a multiple-hearth furnace for thermal treatment of residual materials containing oil and iron oxide is proposed.

Further advantageous embodiments are listed in the sub-claims.

An embodiment of the invention will now be described below with the aid of the enclosed figure.

FIG. 1: is a section through a multiple-hearth furnace for thermal treatment of residual materials containing oil and iron oxide.

FIG. 1 shows a section through a multiple-hearth furnace 10 with several—in this case twelve—hearths 12 one above the other. These self-supporting hearths 12 as well as the casing 14, cover 16 and bottom 18 of the furnace 10 are made from refractory material.

An outlet 20, through which the gases can be evacuated from the furnace, and an opening 22, through which a mixture of residual materials containing oil and iron oxide and reducing agents can be charged on the top hearth, are provided in the cover 16 of the furnace 10.

A shaft 24, on which rakes 26 extending over the respective hearths are secured, is mounted in the centre of the furnace.

The rakes 26 are designed in such a way that they move the material on one hearth from the outside inwards and then from the inside outwards on the underlying hearth in order to convey the material from the top downwards through the furnace 10.

The residual materials containing oil and iron oxide are mixed with solid reducing agents such as lignite coke, petroleum coke or coal outside the furnace 10 and the mixture of residual materials containing oil and iron oxide and reducing agents subsequently charged on the top hearth. Because of the viscous, tacky consistency of the mixture it is introduced by pumps (not shown) into the multiple-hearth furnace.

The residual materials containing oil and iron oxide can possibly be pre-dried outside the furnace before or after they are mixed with the solid reducing agents.

After the mixture of residual materials containing oil and iron oxide and reducing agents is charged on the first hearth of furnace 10, it is circulated by the rakes 26 and conveyed to the edge of the hearth, from where it falls through several openings 28 provided for this purpose on to the underlying hearth. From there the residual materials containing oil and iron oxide mixed with reducing agents are conveyed towards the centre of the hearth and then fall on to the underlying hearth. The residual materials containing oil and iron oxide and, the reducing agents are gradually heated during transport.

The shaft 24 and rakes 26 are air-cooled and openings, through which the air can flow into the interior of the furnace and used there for after-combustion, are provided on the rakes.

During this time moisture is withdrawn from the residual materials containing oil and iron oxides mixed with reducing agents by the contact with hearth 12 and rising hot gases. The top hearths of the furnace 10 thus belong to the drying and preheating zone. After most of the water has evaporated the oil or hydrocarbons begin to evaporate and are entrained by the hot rising gases. Some of the oil and possibly also some of the reducing agents introduced burn in the upper part of the furnace as a result of the high temperatures and the presence of oxygen. The carbon dioxide produced during combustion in turn reacts with the excess carbon of the reducing agents and is converted into carbon monoxide. This carbon monoxide reacts with the residual materials containing iron oxide and reduces the iron oxide to iron.

At least one inlet opening 30, through which additional reducing agents can be introduced into the furnace, is provided in the side walls of the furnace 10—normally in the upper third. These reducing agents may be present both in gaseous form and also in liquid or solid form. These additional reducing agents are, for example, carbon monoxide, hydrogen, natural gas, petroleum and petroleum derivatives or solid carbon carriers such as lignite coke, petroleum coke, blast furnace dust, coal or the like.

The reducing agent, in this case coal, which is introduced to a hearth further below in the furnace 10, is mixed there by the rakes 26 with the heated residual materials containing oil and iron oxide. The iron oxide present in the residual materials containing oil and iron oxide is gradually reduced by the high temperature and the presence of carbon monoxide to metallic iron during transport through the multiple-hearth furnace 10.

The controlled feed of solid, liquid and gaseous reducing agents and gases containing oxygen at various points of the multiple-hearth furnace 10 and the possibility of exhausting excess gases at critical points permit accurate control of the reduction of the residual materials containing oil and iron oxide and realisation of the process under optimum conditions.

Nozzles 30 for injection of hot (250° C. to 500° C.) gases containing oxygen, through which air or another gas containing oxygen can be fed into the furnace 10, are provided in the side wall. As a result of the high temperatures and the presence of oxygen part of the carbon burns to carbon dioxide, which in turn reacts with the carbon present in excess and is converted to carbon monoxide. The carbon monoxide finally reduces the oxides.

As these reactions are predominantly endothermal, it is logical to install in the lower part of the furnace burners 32, which ensure a uniform high temperature in the bottom hearths of the furnace. Gas or pulverised coal burners can be used in this case.

These burners 32 can be fired with gas or pulverised coal with air for preheating and/or additional heating. An additional reduction gas can be produced by the quantitative ratio between oxygen and combustion material or in the case of excess air after-combustion of the process gases is achieved. In the case of pulverised coal firing excess carbon monoxide may be produced in the burner. In the case of outer combustion chambers the ash of the burnt coal can be prevented from entering the furnace and mixing with the iron. The temperatures in the combustion chambers are selected in such a way that the slag produced can be tapped in liquid form and disposed of in vitrified form. The consumption of solid carbon carriers in the furnace 10 and thus also the ash content in the finished product are reduced by production of carbon monoxide.

Feed of a gaseous reducing agent, e.g. carbon monoxide or hydrogen, through special nozzles 44 is provided in the last or last two hearths. Reduction of the iron oxides can be completed in this atmosphere with increased reduction potential.

The iron produced is subsequently discharged through the outlet 46 in the bottom 18 of the furnace 10 together with the ash.

The iron discharged at the outlet 46 is cooled with the ash and any reducing agents, which can be further used, in a cooler 48. The reduced iron is subsequently separated via a magnetic separator 50 from the ash of the reducing agents and any reducing agents, which can be further used.

Reducing agents 52, which can be further used, are then burnt in an outer combustion chamber 34. The gases produced by combustion of the reducing agents can be introduced into the furnace 10, whereas the residues of the reducing agents are removed as ash or liquid slag via an outlet.

The gas mixture from the furnace passes through the outlet 20 into an after-burner 54, where the combustible gases of the gas mixture are burnt. The gas mixture is subsequently introduced into a cooler 56 supplied with a cooling medium and cooled. The cooled gas mixture is subsequently cleaned with the aid of a cyclone filter 58 before it is removed outwards.

This furnace 10 permits the use of different problematic wastes such as contaminated dusts containing iron oxide in addition to use of waste containing oil and iron oxide.

Dusts or sludges containing iron oxide from electric or converter steel mills, which contain hardly any carbon, or dust from the waste gas cleaning of blast furnaces can thus be introduced through a special opening 30 into the furnace 10. The reduction of the residual materials can be controlled accurately and the process carried out under optimum conditions by the controlled feed of solid liquid and gaseous reducing agents and gases containing oxygen at different points of the multiple-hearth furnace 10 and the possibility of exhausting excess gases at critical points.

As these dusts or sludges containing iron oxide are often contaminated by heavy metal oxides, a high proportion of the gases flowing upwards in the furnace can be exhausted from the furnace 10 below the hearth, on to which the dusts or sludges containing heavy metal oxides are charged, by an exhaust connection piece 60 in the side wall and re-injected into the furnace 10 above this hearth through an inlet 62. Consequently the gas quantity on the hearths, on to which the dusts or sludges containing the heavy metal oxides are introduced, is small. The heavy metal oxides, which are present in the dusts or sludges, are reduced and evaporate after introduction into the furnace. They can then be removed from the furnace 10 in a relatively small gas quantity on this hearth through an outlet 64 in the side wall.

The small volume of gas with a relatively high heavy metal content can then be cleaned separately. As a result of the small waste gas quantities low gas flow rates result on the corresponding hearths and only a small amount of dust is thus discharged with this waste gas. Consequently a very high heavy metal concentration results in the waste gas.

The combustible gases of the gas mixture removed are burnt in an after-burner 66. The residual proportion of the gas mixture is cooled in a cooler 68 and subsequently cleaned with the aid of a cyclone filter 70 before it enters the atmosphere.

The iron oxide present in the dusts is reduced to iron with the wastes containing oil and iron oxide fed to the furnace.

All rising gases including the volatile constituents of the reducing agents can be fully burnt in the drying plant for the residual materials containing heavy metal and iron oxide and if necessary for the reducing agents outside the multiple-hearth furnace and the residual heat of the waste gases of the furnace can thus be utilised in an optimum manner.

What is claimed is:

1. A process for thermal treatment of residual materials container oil and iron oxide in a multiple-hearth furnace with several hearths one above the other, in which the residual materials containing oil and iron oxide are mixed with a solid reducing agent, introduced continuously into the multiple-hearth furnace, charged on a top hearth and gradually transferred to lower hearths, the residual materials containing oil and iron oxide are dried on the top hearths, the oil subsequently evaporated and pyrolised, a gas containing oxygen is injected into the multiple-hearth furnace and reacts with part of the reducing agent to form reduction gas, the reduction gas reacting with the iron oxides to form directly reduced iron, and the latter being discharged together with residues of reducing agents in the area of the bottom hearth of the multiple-hearth furnace.

2. The process according to claim 1, wherein the reduced iron is cooled to below 700° C. after discharge from the multiple-hearth furnace and is subsequently separated from the residues of the reducing agent by a magnetic separator.

3. The process according to claim 1, wherein the directly reduced iron is separated from the residues of the reducing agent by screening after discharge from the multiple-hearth furnace in the hot state.

4. The process according to claim 1, wherein the reduced iron is further processed into briquettes.

5. The process according to claim 1, wherein the directly reduced iron is melted with or without residues.

6. The process according to claim 2, wherein any unused reducing agents are separated from the residues after discharge from the multiple-hearth furnace.

7. The process according to claim 2, wherein the residues of the reducing agent are burnt in a gasification reactor, the ash-forming constituents being separated as liquid slag and the crude gas formed being fed to the multiple-hearth furnace as combustion or reduction gas.

8. The process according to claim 1, wherein the reducing agent can be introduced in solid, liquid and/or gaseous form into the multiple-hearth furnace.

9. The process according to claim 1, wherein reducing agents can be introduced to different hearths in the multiple-hearth furnace.

10. The process according to claim 9, wherein coarse-grained reducing agents can be introduced at higher levels into the multiple-hearth furnace and fine-grained reducing agents further below.

11. The process according to claim 1, wherein excess reducing agent is introduced into the multiple-hearth furnace.

12. The process according to claim 1, wherein gases containing oxygen are injected selectively to different hearths.

13. The process according to claim 12, wherein the gases containing oxygen have a temperature of at least 250° C.

14. The process according to claim 1, wherein gaseous reducing agents are injected into the bottom hearths of the multiple-hearth furnace.

15. The process according to claim 1, wherein one or more hearths in the furnace are heated directly or indirectly.

16. The process according to claim 1, wherein gases are exhausted from the multiple-heart furnace at one or more hearths.

17. The process according to claim 16, wherein the reduction potential of the exhausted gases is increased and the gases are subsequently introduced into the multiple-hearth furnace.

18. The process according to claim 1, wherein gases are exhausted from the multiple-hearth furnace below a specific hearth.

19. The process according to claim 18, wherein the reduction potential of the exhausted gases is increased and the gases are subsequently introduced into the multiple-hearth furnace.

20. The process according to claim 1, wherein dust or sludge containing heavy metal and iron oxide are introduced into a hearth of the furnace, reduced there and the heavy metals evaporate.

21. The process according to claim 20, wherein the gases containing heavy metal are exhausted separately on the hearth, where they are formed.

22. The process according to claim 1, wherein the process is carried out under overpressure.

* * * * *